(12) United States Patent (10) Patent No.: US 12,606,069 B2

Laudonio (45) Date of Patent: Apr. 21, 2026

(54) AUTOMOTIVE HEADREST WITH EMERGENCY ADAPTATIONS

(71) Applicant: Alyse Laudonio, Mount Pleasant, WI (US)

(72) Inventor: Alyse Laudonio, Mount Pleasant, WI (US)

( * ) Notice: Subject to any disclaimer, the term of this patent is extended or adjusted under 35 U.S.C. 154(b) by 148 days.

(21) Appl. No.: 18/750,289

(22) Filed: Jun. 21, 2024

(65) Prior Publication Data

US 2025/0388157 A1 Dec. 25, 2025

(51) Int. Cl.
| | |
|---|---|
| B60N 2/879 | (2018.01) |
| B60N 2/882 | (2018.01) |
| B63C 9/135 | (2006.01) |
| B63C 9/13 | (2006.01) |

(52) U.S. Cl.
CPC ............. B60N 2/879 (2018.02); B60N 2/882 (2018.02); B63C 9/135 (2013.01); *B63C 2009/133* (2013.01)

(58) Field of Classification Search
CPC ...... A47C 7/38; B64D 11/0642; B60N 2/879; B60N 2/882; B63C 9/135; B63C 2009/133
USPC .................................. 297/391, 396, 394, 410
See application file for complete search history.

(56) References Cited

U.S. PATENT DOCUMENTS

| | | | | | |
|---|---|---|---|---|---|
| 529,119 | A | * | 11/1894 | Frank | ........................ B63C 9/13 |
| | | | | | 2/200.1 |
| 4,725,076 | A | * | 2/1988 | Taylor | ..................... B60R 22/08 |
| | | | | | 280/808 |
| 5,282,667 | A | * | 2/1994 | Elton | ..................... B60R 22/105 |
| | | | | | 297/238 |
| 5,551,750 | A | * | 9/1996 | Yoshimura | ............. B60N 2/286 |
| | | | | | 297/118 |
| 6,508,512 | B2 | * | 1/2003 | Saberan | ................. B60N 2/856 |
| | | | | | 297/391 |
| 7,306,287 | B2 | | 12/2007 | Linardi et al. | |
| 9,795,219 | B1 | * | 10/2017 | Gracie | ................... B60N 2/806 |
| 10,786,935 | B2 | * | 9/2020 | Lelievre | ................. B60N 2/809 |
| 2002/0163243 | A1 | * | 11/2002 | Parenteau | ............. B60R 22/001 |
| | | | | | 297/483 |
| 2004/0195894 | A1 | * | 10/2004 | Pal | ........................ B60N 2/4279 |
| | | | | | 297/391 |

(Continued)

FOREIGN PATENT DOCUMENTS

| | | | | | |
|---|---|---|---|---|---|
| AT | | 527399 B1 | * | 2/2025 | ............. A47C 7/383 |
| CN | | 111873879 A | | 11/2020 | |

(Continued)

*Primary Examiner* — Jose V Chen

(74) *Attorney, Agent, or Firm* — Jansson Munger & McKinley Ltd.

(57) ABSTRACT

A seatback-engageable automotive headrest including a buoyant cushion body within a casing, a rigid structure with an internal portion within the casing and an external portion outside the casing for detachable connection with the top of an automobile seatback, all as typical for automotive headrests, but also having the improvement of the casing being configured to define an accessibility opening, and a tether inside the casing adjacent to the accessibility opening and permanently attached to the rigid structure, such that, with the headrest detached from the seatback, a portion of the tether can be grasped through the accessibility opening and withdrawn for securement to a person to facilitate flotation.

24 Claims, 5 Drawing Sheets

(56) References Cited

U.S. PATENT DOCUMENTS

| | | | | |
|---|---|---|---|---|
| 2004/0251721 A1* | 12/2004 | Yoshida | ............. | B60R 21/2338 |
| | | | | 297/452.41 |
| 2005/0035641 A1* | 2/2005 | Petersen | ................ | B60N 2/803 |
| | | | | 297/396 |
| 2006/0061185 A1* | 3/2006 | Tseng | ..................... | B60N 2/879 |
| | | | | 297/391 |
| 2006/0103195 A1* | 5/2006 | Stanley | ................... | B60N 2/80 |
| | | | | 297/220 |
| 2007/0052274 A1* | 3/2007 | Morphew | ............. | A47D 15/00 |
| | | | | 297/392 |
| 2007/0188004 A1* | 8/2007 | Browne | .................. | A47C 7/38 |
| | | | | 297/391 |
| 2008/0160849 A1* | 7/2008 | Steger | .................... | B63C 9/135 |
| | | | | 441/122 |
| 2009/0325436 A1* | 12/2009 | Messina | ................. | B63C 9/135 |
| | | | | 441/88 |
| 2010/0133888 A1* | 6/2010 | Montuore | ............ | B60N 2/2851 |
| | | | | 297/397 |
| 2011/0101738 A1* | 5/2011 | Jensen | ................... | B60N 2/812 |
| | | | | 297/410 |
| 2011/0101761 A1* | 5/2011 | Demaras | ................ | B60N 2/882 |
| | | | | 297/393 |
| 2018/0295917 A1* | 10/2018 | Vo | ........................... | A42B 1/041 |
| 2023/0302981 A1* | 9/2023 | Joyner | .............. | B64D 11/0642 |
| 2023/0311732 A1* | 10/2023 | Tanabe | .................. | B60N 2/879 |
| | | | | 297/217.3 |
| 2025/0033543 A1* | 1/2025 | Whalen | .................. | B60N 2/879 |

FOREIGN PATENT DOCUMENTS

| | | | | |
|---|---|---|---|---|
| CN | 214189413 U | 9/2021 | | |
| CN | 216101694 U | 3/2022 | | |
| DE | 10 2011 087661 B4 | 2/2019 | | |
| DE | 102023100392 A1 * | 1/2024 | .......... | B60N 2/7011 |
| EP | 1 580 067 B1 | 1/2010 | | |
| EP | 3 094 517 B1 | 3/2021 | | |
| EP | 3798051 A1 * | 3/2021 | ............. | B60N 2/879 |
| GB | 2408681 A * | 6/2005 | .......... | B60N 2/6063 |
| JP | 3912056 B2 | 5/2007 | | |
| JP | 4008820 B2 | 11/2007 | | |
| KR | 100876601 B1 | 12/2008 | | |

* cited by examiner

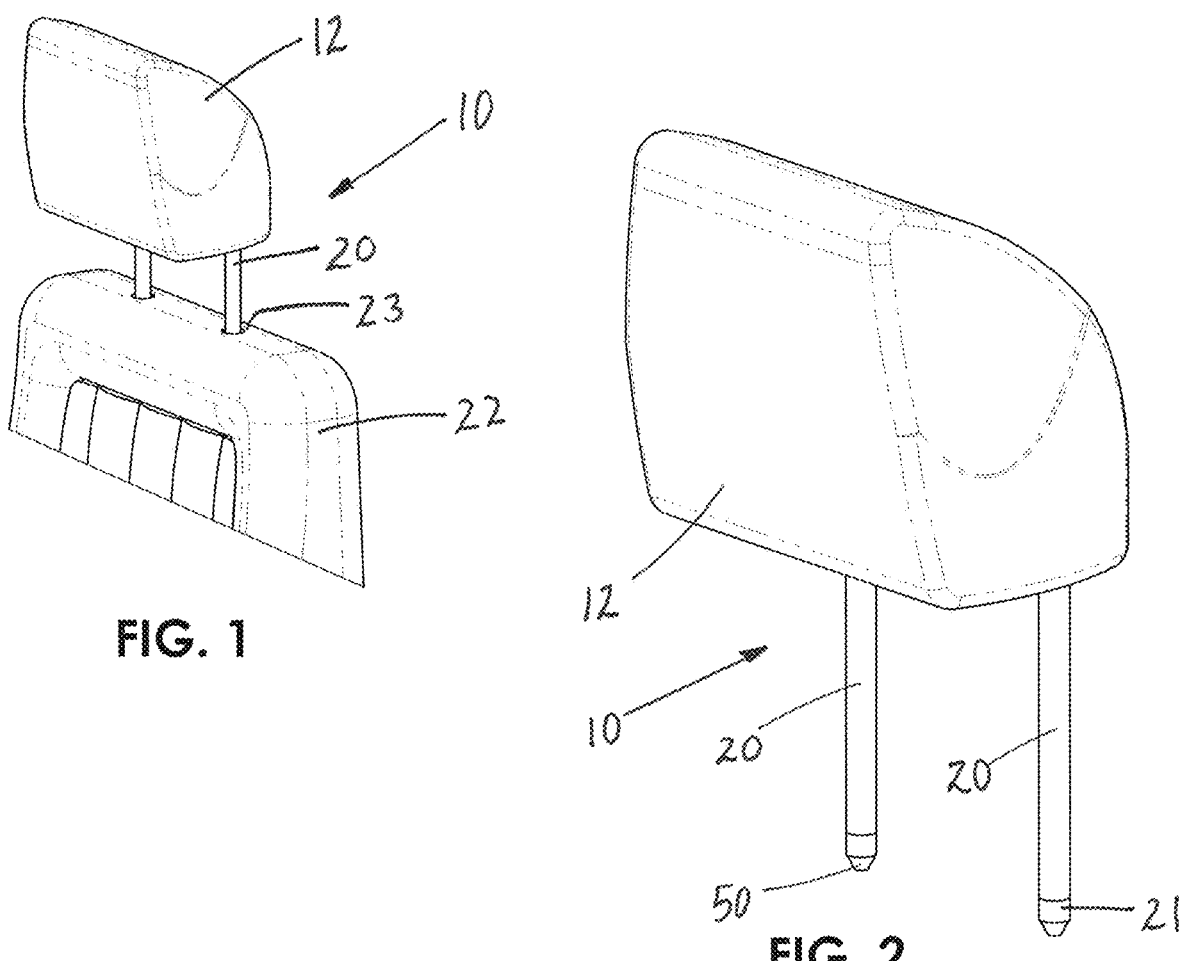
FIG. 1
FIG. 2
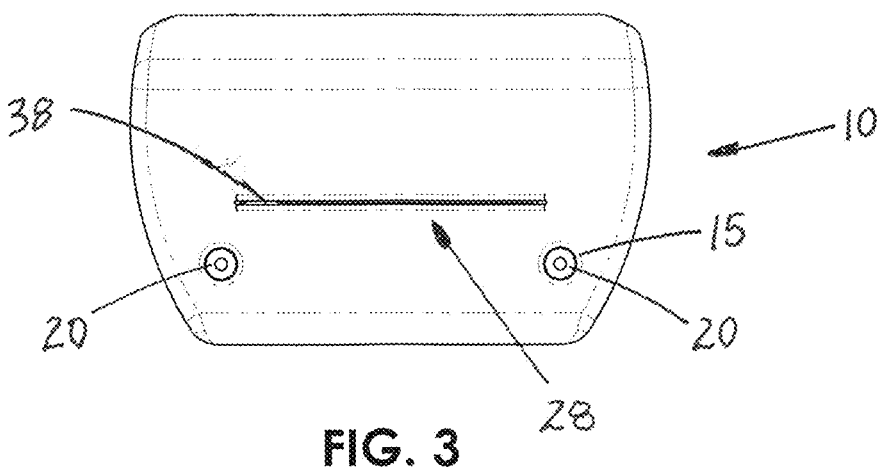
FIG. 3

8B

AUTOMOTIVE HEADREST WITH EMERGENCY ADAPTATIONS

FIELD OF THE INVENTION

The present invention relates generally to automotive headrests and more specifically to the field of automotive headrests with adaptations for emergency-related purposes.

BACKGROUND OF THE INVENTION

Submersion of automobiles in rivers, lakes, ocean bays or other bodies of water with passengers trapped in their vehicles accounts for a surprisingly high percentage of drowning fatalities, as high as just over ten percent according to some informed estimates. In typical situations, accidents of various kinds occurring on or near bridges leads to submersion of vehicles, with fatalities caused by drowning rather than by physical injury or other trauma resulting from accidents. Such problems are far more common than specific sensationalized incidents such as involved with bridge collapses, as occurred recently in Baltimore.

In any accident involving vehicle submersion, the greatest needs are for living human beings, whether adults or children, to be able to exit the submerged or submerging vehicle and, once in the water, to have available flotation aids. Unlike what is readily available to persons as passengers on boats, virtually all of which have readily accessible life preservers for passengers, no flotation aids are readily available for persons in submerged (or submerging) vehicles.

This invention is directed to a solution of this problem and to the related problems of getting ready access to flotation aids in a situation in which flotation can provide the attendant lifesaving advantage.

The above problems have not been completely ignored, but there remains a need for solutions for the exceedingly rare but deadly problem of drownings in situations involving submerged and submerging vehicles. For a concept or apparatus to truly be regarded as a Asolution,@ it must be useful in a practical sense. This at least means that it must be something that can be widely available to the driving public, and preferably not something requiring a special high-cost purchase by automobile owners, because automobile owners would rarely avail themselves of something said to address a problem they would hardly ever conceive as significant. From a practical standpoint, a possible solution must be something which can be taken advantage of quickly and easily. It has been reported that, in typical situations in which an automobile plunges into a body of water and is in the process of submerging, trapped passengers usually have no more than thirty to ninety seconds before the vehicle is completely submerged. In other words, speed is of the essence. Too many steps and/or too much effort will make a possible solution useless B not really a solution to the problem.

Before describing and discussing the invention in detail, it is necessary to describe in detail some of the context of this invention B which takes advantage of automotive headrests B which are virtually universal in their use in all motor-driven vehicles traversing the roads and crossing the bridges in America and worldwide. Virtually all automotive vehicles available worldwide now have driver and passenger seating which includes or accommodates the presence of cushioning structure as part of the seatback but much more commonly secured at the top of the seatback. Such cushioning, of course, is positioned to prevent the head of a driver or passenger from suddenly whipping backward upon occurrence of rear-end or other collisions. In most cases, such cushioning structure is in the form of a headrest adjustably secured to the top of the cushioned seatback.

Such seat-attached headrests themselves include a cushion body tightly contained within a casing, typically of a casing material (whether leather or a polymeric sheet material) the same as or in some way similar to the material forming the surface of the seatback. The contained cushion body is most typically a polymeric foam material of sufficient density such that, including within its encasement as mentioned above, it is substantially fixed in shape and has compressibility appropriate for its principal head-cushioning purpose.

Such headrests typically also have rigid structure including (1) an internal portion within the cushion body and casing, such internal portion in permanent engagement with the cushion body, and (2) a pair of straight rigid metal seat-attachment shafts projecting downwardly from the cushion body. The seat-attachment shafts are parallel to and spaced from one another in position for adjustable engagement at the top of the seatback by sliding insertion of the shafts into female shaft-engagement receptors situated at the top of the seatback. This type of seat-attachable headrest structure is used for and forms the immediate context of the present invention.

There have been efforts to solve the problem of drownings caused by automobile accidents resulting in submerged and submerging vehicles, and some efforts have involved use of automotive headrests. But prior efforts have failed to satisfy one or more of the practicality requirements B involving things such as low cost, simple structure, and perhaps most important ease, and speed of use in an emergency.

One example, seen in JP2015132364A, involves drastic modification of an automotive vehicle headrest to build in a substantial internal storage space, sufficient for storing an inflatable life-preserver jacket or inflatable buoy therewithin along with a gas supply unit. In an incident involving the vehicle being submerged, the automotive headrest may be opened so that the inflatable life-preserver jacket or buoy and the gas supply may be withdrawn, and the inflatable life-preserver or buoy is donned by the passenger or placed on the passenger (who may or may not be injured by the accident) and the gas supply is used to inflate the life jacket, presumably before or after the possibly-injured passenger has somehow left the submerged or submerging vehicle. For a number of reasons, this sort of proposed solution falls far short of a number of the practicality requirements mentioned or alluded to above.

Another example, seen in KR101950613B1, involves redesigning automotive vehicle headrests so that, when they are withdrawn from their separate engagement with their respective seatbacks, two or more of them can be coupled or even ganged together thereby to form buoyancy tubes. The buoyancy of vehicle headrests is used, and when coupled together they together form buoyancy tubes which can then be used by an individual in the water or thrown to an individual in the water needing help. This also describes a supplemental body between headrests into which gas may be injected apparently for enhanced buoyancy. While headrest buoyancy is recognized, the coupling or ganging headrests together adds complexity, a negative factor when it comes to some of the practical points referred to above.

In summary, there remains a need for highly practical, easily usable improvements in apparatus for dealing with the problem of preserving life of passengers, whether adults or children, faced with an immediate, unexpected situation involving being in a submerged or submerging vehicle after an accident.

OBJECTS OF THE INVENTION

A principal object of the present invention is to provide a practical solution to the difficult but rarely recognized problem of preventing or minimizing loss of life by drowning in situations involving submerged and submerging vehicles resulting from automobile accidents.

Another object of this invention is to provide such a solution which facilitates quick, and relatively easy (non-complex) procedures by persons, often shocked if not injured persons, in vehicles exposed to such situations.

Still another object is to achieve such a solution in a manner that does not require major structural modification of existing structures within automobiles, that is relatively low in cost, and that does not impose any upkeep requirements during the typical long lifespans of automotive vehicles B from assembly to final use.

Yet another object is to provide an improved way to effectively employ the buoyancy of automotive headrests to achieve the purposes referred to above.

These and other objects of the invention will be apparent from the following descriptions and from the drawings.

SUMMARY OF THE INVENTION

The present invention is an improvement which addresses and solves the above-mentioned problems and shortcomings, and can provide a new standard for addressing the problem of loss of human life caused by drownings related to submerged and submerging vehicles resulting from automobile accidents and the like.

A summary description of one aspect of the present invention is an improvement in a seatback-engageable automotive headrest of the sort having a cushion body of polymeric foam within a casing and a rigid structure that includes (1) an internal portion within the cushion body and engaged with the cushion body and (2) a pair of rigid seat-attachment shafts spaced from one another and projecting downwardly from the cushion body for withdrawable engagement with the seatback. The improvement in such headrest includes the headrest casing defining an accessibility opening and the headrest having a tether positioned within the casing adjacent to the accessibility opening and attached with respect to the rigid structure such that, with the headrest manually withdrawn from its engagement with the seatback, a portion of the tether can be manually grasped through the accessibility opening and manually partially withdrawn for securement to a person to facilitate flotation. The accessibility opening is preferably located on the underside of the headrest and between the projecting shafts, and the tether is preferably attached with respect to the internal portion of the rigid structure, and most preferably directly attached to the internal portion of the rigid structure.

In certain preferred embodiments, the accessibility opening and the tether are configured to block, or substantially block, any view of the tether within the casing while still allowing manual reaching therethrough to grasp and partially withdraw the tether from the case for emergency purposes. The inventive configuration, particularly with the accessibility opening being on the underside of the headrest positioned between the locations where the shafts emerge from the casing of the headrest, also allows the inventive headrest to have the completely-normal appearance of an automotive headrest, showing nothing about the lifesaving functions it provides, though such capability will surely be known to the vehicle owner if not directly indicated by some safety notice.

It is preferred that the tether be flexible strapping and that, during stowage, it be doubled over (one or more times) against a surface of the headrest casing within the headrest in order to minimize storage volume for the strapping within the casing. This configuration avoids any need for a separate opening step to allow a person=s hand to grasp and withdraw the tether, and also serves to maximize available buoyancy by maximizing the volume of cushioning polymeric foam within the headrest casing.

In certain preferred embodiments the accessibility opening is defined by inwardly-turned portions of the casing. In such embodiments the strap may be doubled over and located out of sight between inwardly-turned portions of the casing.

It certain other preferred embodiments the accessibility opening may be defined by overlapping portions of the casing, since this is another configuration eliminating any need for a separate opening step to allow a person=s hand to grasp and withdraw the tether. In such overlapping situations, it is preferred that at least one of the overlapping portions of the headrest case be elastically stretchable to facilitate reaching through the accessibility opening.

In certain preferred embodiments, the tether has two proximal ends, each of which is attached with respect to the internal portion of the rigid structure at positions laterally spaced from one another. In certain of such situations it is preferred that the tether be a unitary piece continuous from one of the proximal ends thereof to the other proximal end and that it be of sufficient length to extend around the person. In certain other preferred embodiments, the tether includes two tether pieces, each of which includes a respective one of the proximal ends and extends to a respective distal end, the two distal ends being engageable together to secure the tether around the person. The two distal ends are preferably adjustably engageable together to adjust the length of the tether around the person.

In highly preferred embodiments, the tether is configured and arranged such that, with the tether withdrawn in an emergency deployment, the headrest is secureable to the person by the tether being around the person with the headrest in an inverted orientation in front of the person with the seat-attachment shafts projecting upwardly in position to be grasped by the person=s hands.

It is also preferred that the seat-attachment shafts have tapered ends to facilitate use of the shafts for automobile glass breakage with the headrest withdrawn from seatback engagement in an emergency, such use of course occurring before the headrest is tethered to the person to be rescued. In such situations, the seat-attachment shafts preferably have distal ends including carbide tips, preferably tapered, to facilitate use of the shafts for such automobile glass breakage.

A summary description of another aspect of the invention is that it is an automotive headrest including a buoyant cushion body within the headrest casing and a rigid structure with an internal portion within the casing and an external portion outside the casing by which the headrest is detachably engageable with an automobile seatback, the headrest having the improvement including (1) the casing being configured to define an accessibility opening and (2) a tether inside the casing, the tether being positioned adjacent to the accessibility opening and attached to the internal portion of the rigid structure such that, with the headrest detached from the seatback, a portion of the tether can be grasped through the accessibility opening and withdrawn for securement to a person to facilitate flotation.

The preferred features and configurations described above are applicable to this somewhat broader description of the invention. As earlier noted, it is highly preferred that the tether be configured and arranged such that, in an emergency deployment, the headrest can be securable to the person by the tether being around the person with the headrest in an inverted orientation in front of the person, allowing the person to grasp the upwardly-projecting shafts in his or her two hands, which can facilitate control of the combined buoyancy of the person and headrest in a body of water.

Of paramount importance in emergency deployment of the inventive automotive headrest is that the headrest be secured to the person in a manner keeping the person=s head in a position for continued breathing. In some situations, it may be best for the tether to be around the person=s torso, underneath both of at least one of his or her armpits. The tether and adjustability of the tether can facilitate this for children and adults of widely varying sizes, and also for varying degrees of accident-related injury and shock. The ease and speed of deployment in widely-varying accident situations are important factors and advantages of this invention.

BRIEF DESCRIPTION OF THE DRAWINGS

FIG. 1 is a perspective view of an automotive headrest, which is a preferred embodiment of this invention, detachably engaged with a corresponding seatback, such headrest having the characteristics of this invention but not showing such characteristics from this perspective angle B in other words, having the appearance of a typical standard automotive headrest.

FIG. 2 is an enlarged perspective view of the headrest of FIG. 1 from the same angle as used in FIG. 1 but with the headrest detached from engagement with its corresponding seatback B as would occur in the initial deployment step in use of the invention in an emergency.

FIG. 3 is an underside view of the headrest with the headrest detached from engagement with its corresponding seatback as seen in FIG. 2, but this view showing the accessibility opening through which manual access is gained to the tether within the headrest B as would occur during the next deployment step in use of the invention in an emergency in order to partially withdraw the tether to enable attachment to a person.

FIG. 5 shows the withdrawable portion of the tether having two portions with their distal ends interconnected by a snap buckle, facilitating adjustable connection around a person during emergency deployment.

FIG. 8A is a fragmentary cross-sectional view taken along a front-to-back cross-sectional plane and FIG. 8B is a somewhat lesser-enlarged fragmentary cross-sectional view taken along a side-to-side cross-sectional plane as indicated in FIG. 8A.

Figure 5:
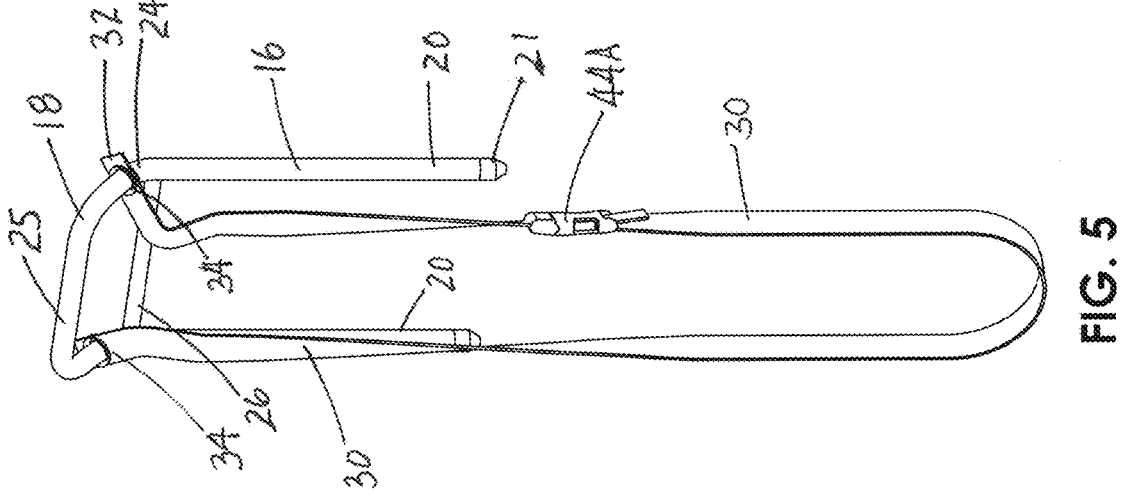
FIG. 5 is a perspective view of the rigid structure of the inventive headrest, with the headrest casing and polymeric foam removed to reveal all of the headrest rigid structure and the tether engaged therewith, i.e., showing the two proximal ends of the tether permanently secured to the rigid structure at positions always within the headrest casing and polymeric foam, but also showing the full tether, including the portions stowed within the headrest casing until deployment in an emergency.

These and other preferred embodiments of the invention will now be described in greater detail.

DETAILED DESCRIPTION OF PREFERRED EMBODIMENTS

FIG. 1 shows an automotive headrest 10 which is a preferred embodiment of this invention. Headrest 10, like most automotive headrests, is detachably engaged with a corresponding seatback 12. The drawing figures show aspects of headrest 10 including typical characteristics of most automotive headrests but, like other embodiments of the present invention, to have those characteristics which allow headrest 10 to provide the lifesaving functions it provides. The invention is such that it also preferably allows manufacturers, to whatever extent they choose, to present the headrests as having the normal appearance of typical automotive headrests.

Figures 6, 7, 7A:
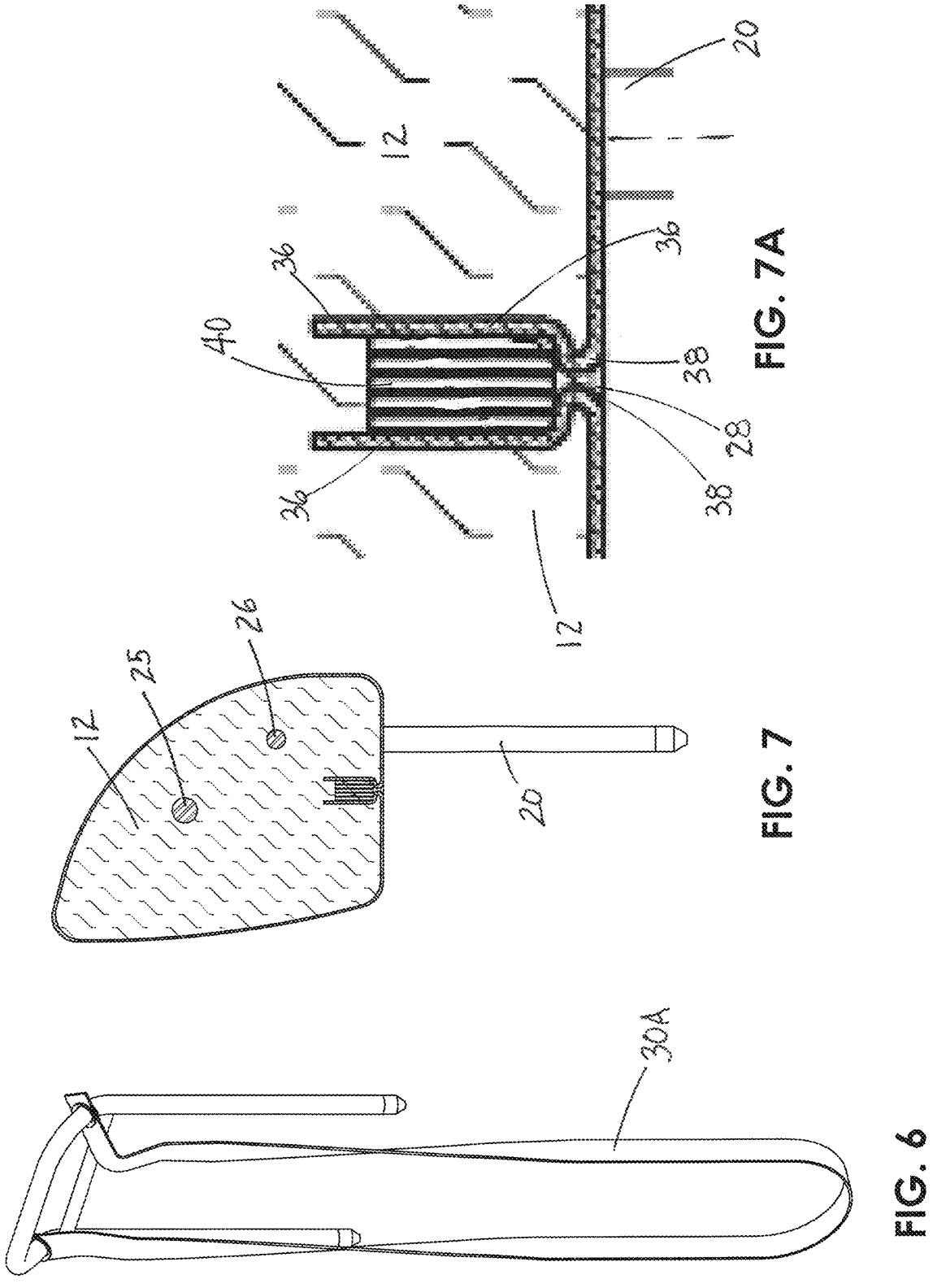
FIG. 6 is a perspective view similar to FIG. 5 but showing an alternative embodiment in which the withdrawable portion of the tether extends continuously to provide a continuous loop for securement around a person during deployment in an emergency situation.
FIG. 7 is a side cross-sectional view of the headrest of FIG. 1, taken along the middle front-to-rear plane, illustrating certain characteristics of the headrest of FIG. 1 related to one preferred configuration of the accessibility opening and related minimal-volume stowage of the tether within the headrest casing during its long, and hopefully permanent, period of non-use.
FIG. 7A is an enlarged fragmentary portion of FIG. 7 which better illustrates certain details of the preferred configuration accessibility opening and tether stowage of FIG. 7.

Headrest 10 has a cushion body of polymeric foam 12, as shown in FIG. 7, within casing 14. (In the drawings, numeral 12 is used both for the polymeric foam itself where it is shown in FIGS. 7, 7A, 8A and 8B, and also to point to the cushion body formed by the casing having the polymeric foam therewithin.) Headrest 10 also has a rigid structure 16, portions of which are shown in FIGS. 1-4 and 7 and all of which is shown in FIG. 5. In other words, as is typical, rigid structure 16 includes an internal portion 18 (i.e., a portion within the cushion body) shown in FIG. 5, and two parallel seat-attachment shafts 20, the proximal portions of which are always within cushion body 12 but the distal portions of which emerge downwardly from casing 14 through casing openings 15 and extend to distal ends 21. Shafts 20 are inserted within shaft-receiving orifices 23 in the top of seatback 22, thus providing seatback engagement for headrest 10 in the normal fashion. The notching seen on the right shaft in FIG. 4 facilitates occasional adjustment of the height of engagement of headrest 10 with seatback 22, as often used in automotive headrests, in order to accommodate drivers and passengers of varying stature.

Internal portion 18 of rigid structure 16 is permanently engaged with polymeric-foam cushion body 12 within casing 14, again in whatever ways are typically used in manufacture of headrests, such as by means of formation of the foam body within casing 14. As seen in FIG. 5, rigid structure 16 is a bar bent into a U-form which includes each of shafts 20 as U-form legs, such legs also being bent to have a further angled portion 24 near the juncture portion 25 of the U-form, i.e., the portion of the U-form extending continuously between the legs of the U-form. As with many automotive seatbacks, rigid structure 16 also has a crossbar 26 extending between the U-form legs, parallel with and fairly close to juncture portion 25. Crossbar 26 extends between leg positions near angled portions 24, but a bit nearer shaft distal ends 21 than are angled portions 24.

Headrest 10 forms and includes an accessibility opening 28 on the underside of casing 14, as seen in FIGS. 3, 7 and 7A. Accessibility opening 28 provides manual access to tether 30, which is in the form of a flexible strap stored and positioned within casing 14 adjacent to accessibility opening 28, as illustrated in FIGS. 7 and 7A. In the preferred embodiment represented by headrest 10, the positioning of accessibility opening 28 is on the underside of casing 14 near where shafts 20 emerge from casing 14. Accessibility opening 28 is a lengthy opening extending substantially parallel to the imaginary line segment between where shafts 20 emerge from casing 14. The position of the elongate accessibility opening 28 may be described as Abetween shafts 20.@

Figure 4:
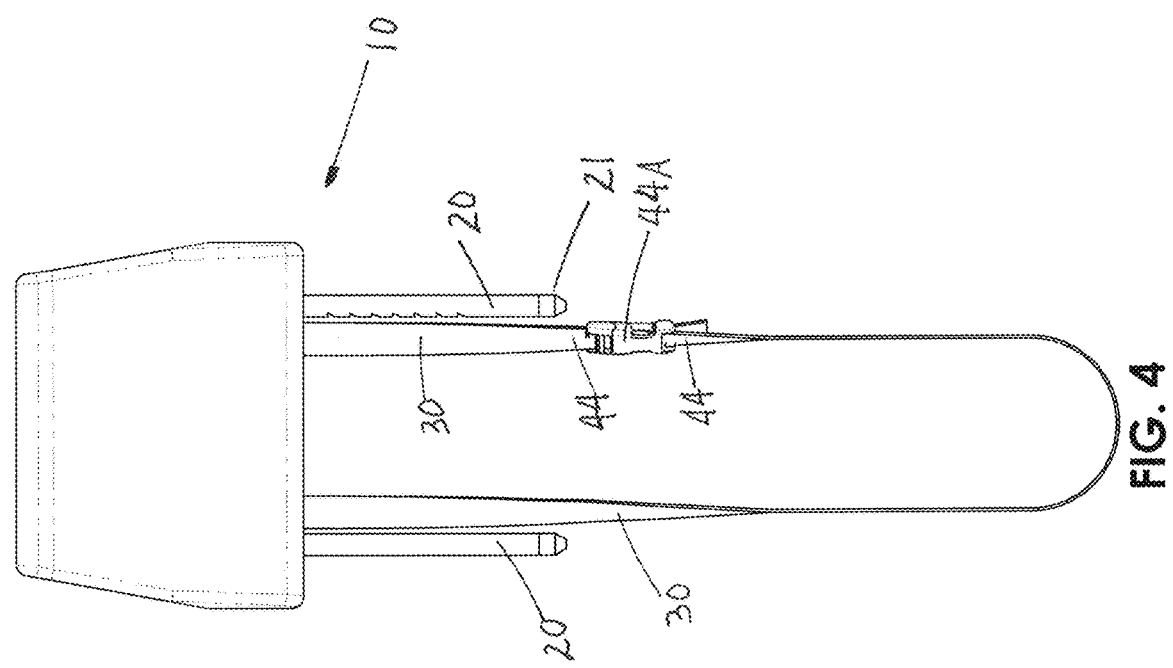
FIG. 4 is a front view of the headrest but showing the tether partially withdrawn from within the casing of the headrest, i.e., fully deployed and in position to enable attachment to a person.

In this context, Abetween@ has a broad meaning, including: (a) along a line offset from such imaginary line segment but parallel thereto, as seen in FIGS. 3, 4 and 7 with respect to headrest 10; (b) directly on and along such imaginary line segment; (c) situated on such imaginary line segment; and (d) situated offset from such imaginary line segment. Such placements of the accessibility opening formed by the headrest casing can be helpful in giving the inventive headrest an appearance virtually completely unchanged from the appearance of normal automotive headrests. In any event, the location of an accessibility opening in the casing can be a matter of design choice.

What is of importance in inventive headrest 10 is that tether strap 30 be permanently attached with respect to internal portion 18 of rigid structure 16 such that, with headrest 10 withdrawn from its engagement with seatback 22, a portion of the tether can be manually grasped through accessibility opening 28 and withdrawn from casing 14 for securement to a person such that headrest 10 can serve its life-preserving function. In other words, it is essential that tether 30, even though partially withdrawn from casing 14, does not disengage from the combination of rigid structure 16 and cushion body 12, regardless of the forces imposed on the structure. With headrest 10 secured to the person, the buoyancy of the polymeric foam will add important buoyancy to the person to which the headrest is secured B in other words, facilitate flotation of the person to the extent the person=s breathing efforts will inhale air rather than water.

Tether strap 30 may be attached to internal portion 18 of rigid structure 16 in many ways. In the embodiments illustrated in the drawing figures, tether strap 30 has two proximal ends 32, each secured to rigid structure 16. More specifically, at or near each of proximal ends 32 of strap 20 a grommet 34 is secured, grommets 34 having internal diameters only slightly greater that the diameter of unbent portions of cylindrical shafts 20 which form the legs of the U-form which is rigid structure 16. In assembling tether strap 30 with rigid structure 16, grommets 34 are slipped onto the legs of the U-form and moved to positions therealong fairly near juncture portion 25 of the U-form. In one form of assembly, each of the legs of the U-form is then bent to create angled portions 24 at positions along the legs farther from the threaded-on grommets 34 of strap proximal ends 32. The bending to form angled portions 24 slightly increases the largest cross-diameter of each leg sufficiently so that it is essentially impossible for proximal ends 32 of strap 30 to be pulled off shafts 20. Crossbar 26 is then attached between shafts 20 to further assure that proximal ends 32 of tether strap 30 are permanently attached to rigid structure 16 in positions well inside casing 14.

Once tether 30 is permanently secured to rigid structure 16, casing 14 can be assembled with rigid structure 16. The manner in which headrest 10 is formed may be any of the ways now commonly used or usable for manufacture of seat-engageable headrests, which virtually always involves engagement of a casing and a polymeric form firmly with a rigid structure. The precise methods and procedures for formation of headrest 10 are not important to this invention, but an example is described here for completeness. None of these details are of importance to the claimed invention.

Casing 14 may be made of a tough high-quality flexible sheet material, which may be a leather layer, a strong and attractive polymeric sheet material such as a PVC material or the synthetic material referred to as microfiber leather, or any other of a wide variety of suitable materials which are flexible and tough. It is preferred, but not essential, that casing 14 be of a material that is either waterproof or at least not hydrophillic in nature. Such flexible material is cut as appropriate in forming the intended headrest shape. Openings 15 are cut at the correct locations and sized to tightly receive shafts 20. Then rigid structure 16, with tether strap 30 already attached thereto as describe above, is assembled with the casing material with shafts 20 inserted in openings 15, ready for addition of what becomes polymeric foam body 12.

One way to produce polymeric foam body 12 within casing 14 is a well-known injection molding process. This may involve the assemblage referred to in the above paragraph being placed in a mold the shape of which is based on the final intended headrest shape, after which the chosen foam-forming polymeric materials for formation of polymeric foam body 12 are injected into casing 14 within the mold using well-known injection molding techniques, after which the foam-forming polymeric material thereafter expands and cures within casing 14 to form the final shape of headrest 10 and polymeric foam body 12 within casing 14. This process serves to further firmly engage rigid structure 15 with polymeric foam body 12 and further secure the engagement of proximal ends 32 of tether strap 30 within polymeric foam body 12.

Polymeric foam body 12 is preferably a closed cell foam, chosen of course mainly to have the desired cushioning properties, but also to have a density low enough to provide helpful buoyancy properties for the emergency purposes of the headrest of this invention. In this connection, it is noted that typical polymeric foam bodies for automotive headrests have low density that is suitable to provide sufficient buoyancy for the intended emergency purposes. Suitable polymeric foam materials will be apparent to those skilled in the art of forming automotive headrests when they become aware of the details of the present patent disclosure.

Figure 8A:
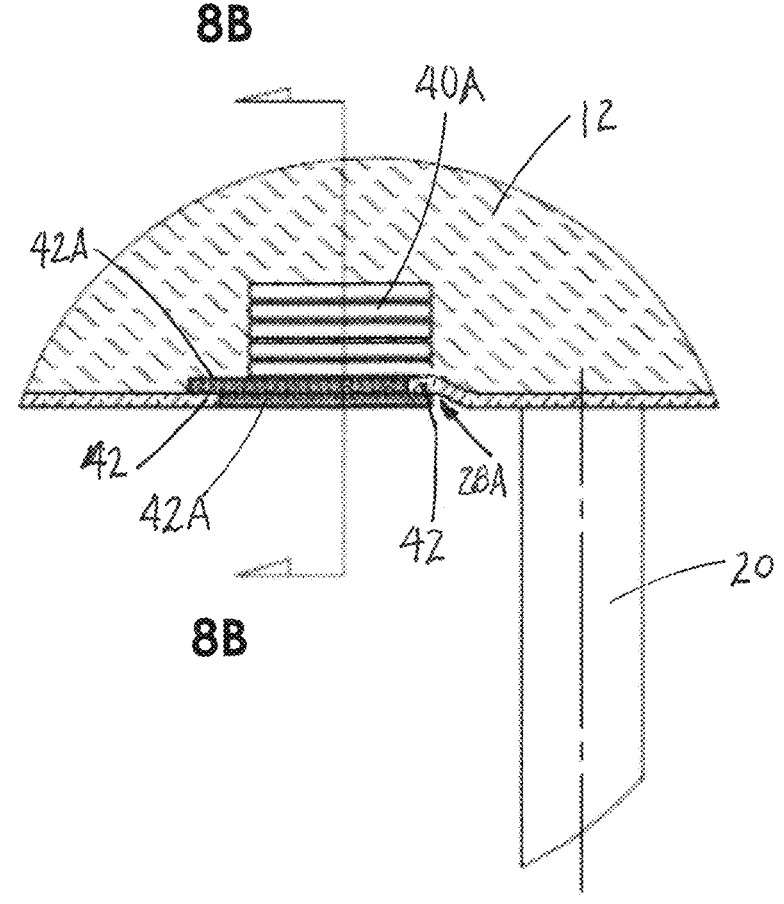
FIGS. 8A and 8B are enlarged fragmentary cross-sectional views of another embodiment illustrating another preferred configuration of the accessibility opening and related minimal-volume stowage of the tether within the headrest casing.
Figure 8B:
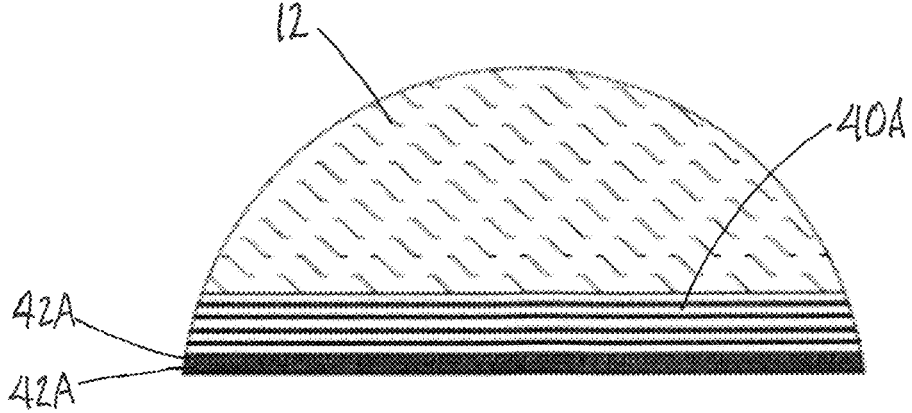

It is highly desirable that the stowage of strap 30, or any other form of tether, be accomplished in a manner requiring as little as possible storage volume within casing 14, because such minimizing allows maximizing of the volume of polymeric foam body which provides buoyancy in emergency use of the headrest. FIGS. 7 and 7A show one preferred configuration for minimizing stowage volume. An alternative preferred configuration is shown in FIGS. 8A and 8B. In each of these embodiments, strap 30 is doubled over on itself and against immediately adjacent portions of casing 14. It is also highly useful that the accessibility opening, whatever its exact configuration, be accessible merely by manual grasping through the opening, i.e., without any separate prior opening or detachment step.

FIGS. 7 and 7A illustrate that accessibility opening 28 in casing 14 of headrest 10 includes a pair of opposed inwardly-turned portions 36 of casing 14. Inwardly-turned portions 36 together essentially form a pair of lips 38 and make the accessibility something that can be described as a mouth, the mouth being closed with lips 38 either against one another or sufficiently close to one another to enclose tether strap 30 from view, or from easy view.

As can be seen best in the enlarged fragmentary sectional view of FIG. 7A, inwardly-turned portions 36 of casing are turned inwardly by a distance sufficiently in excess of the width of strap 30 to allow doubled-over strap portion 40 to be against or at least immediately adjacent to inwardly-turned portions 36 of casing 14, and also spaced a bit from lips 38 such that the mouth they form is closed, or nearly closed. The term Adoubled-over@ in describing portions of tether strap 30 in preferred embodiments is used as a way to describe the orientation of the strap, and not used in a numerical sense; thus, as can be seen in FIGS. 7 and 7A, doubled-over strap portion 40 is doubled over in more than two layers, in this case five layers. The length of the portion of tether strap 30 that can be withdrawn from its stowage position within casing 14, of course, must be sufficient for securing headrest 10 to a person, typically around a person such as around the person=s neck and over the person=s shoulders. Therefore, the length of accessibility opening 28, with respect to which such doubling over of strap 30 can readily be done, and the extent of doubling over will be enough to provide sufficient usable strap length during deployment.

FIG. 8A illustrates accessibility opening 28A, which is in an alternative form of opening, and its relationship of accessibility opening 28A to doubled-over strap portion 40A. Unlike the embodiment of FIGS. 7 and 7A, which has the layers of double-over strap portion 40 essentially perpendicular to the underside of the headrest, this alternative embodiment has the layers of doubled-over strap portion 40A parallel to the underside of the headrest.

As illustrated in FIG. 8A, accessibility opening 28A of this alternative embodiment is formed by overlapping casing portions 42 which are horizontal in orientation with the headrest in its normal seatback-attached orientation; in other words overlapping casing portions 42 have abutting surfaces (in surface-to-surface engagement), with abutting overlapping casing portions being readily manually separable to reach the five layers of doubled-over strap portion 40A. This facilitates manual reaching and grasping of tether strap 40 for manual withdrawal of tether strap 40 in an emergency deployment. Doubled-over strap portion 40A (in this embodiment having five layers) is stowed against the inside surface of casing 14 at or near overlapping casing portions 42.

As shown in FIG. 8A, overlapping casing portions 42 include elastically-stretchable edge portions, each marked by numeral 42A, which can facilitate reaching through accessibility opening 28A and also helps assure that accessibility opening 28A remains closed during the desired long lifetime of non-deployment.

While FIG. 8A illustrates the five layers of the doubled-over strap portion 40A from an angle showing the width of the strap, the fragmentary cross-sectional view of FIG. 8B is taken along a plane orthogonal to the plane of FIG. 8A, and shows the five layers of a portion of the doubled-over length of strap portion 40A. The full doubled-over length of strap portion 40A extends approximately the full length of the accessibility opening, not shown in the cross-sectional plane of FIG. 8B. However, such figure does show the two overlapping elastic edge portions 42A of the casing.

Manufacture of each of the preferred forms of accessibility openings referred to above can be accommodated in the process of cutting or other steps in determining the shape of the material from which casings are formed for the inventive headrests. Such manufacture may also involve placing the doubled-over strap in appropriate positions vis-a-vis the casing portions defining the accessibility opening before injection of polymeric foam-forming material as described above. This will allow the doubled-over strap portions to be fully accessible by manually reaching though the accessibility opening, and also allow the unfurling of the doubled-over portions despite the presence of some the adjacent polymeric foam.

FIGS. 4 and 5 serve to illustrate the form of tether strap 30 of headrest 10, and FIG. 6 illustrates an alternative embodiment having tether strap 30A. In each case, the tether strap has two proximal ends 32, each of which is attached with respect to the internal portion 18 of rigid structure 16, as previously described and illustrated.

As seen in FIGS. 4 and 5, tether strap 30 has two tether pieces, each extending to a respective distal end portion 44. Distal ends portions 44 each have a common strap-attached snap buckle member 44A, and snap buckle members 44A are snap-engageable together for easy securement of deployed headrest 10 around a person in an emergency situation. At least one of snap-buckle members 44A is configured to facilitate adjustment of the length of tether strap 30 in a deployment.

As seen in FIG. 6, tether strap 30A is a unitary piece continuous from one of the proximal ends thereof to the other proximal end, and tether strap 30A is made of sufficient length to extend around the person.

Figure 9:
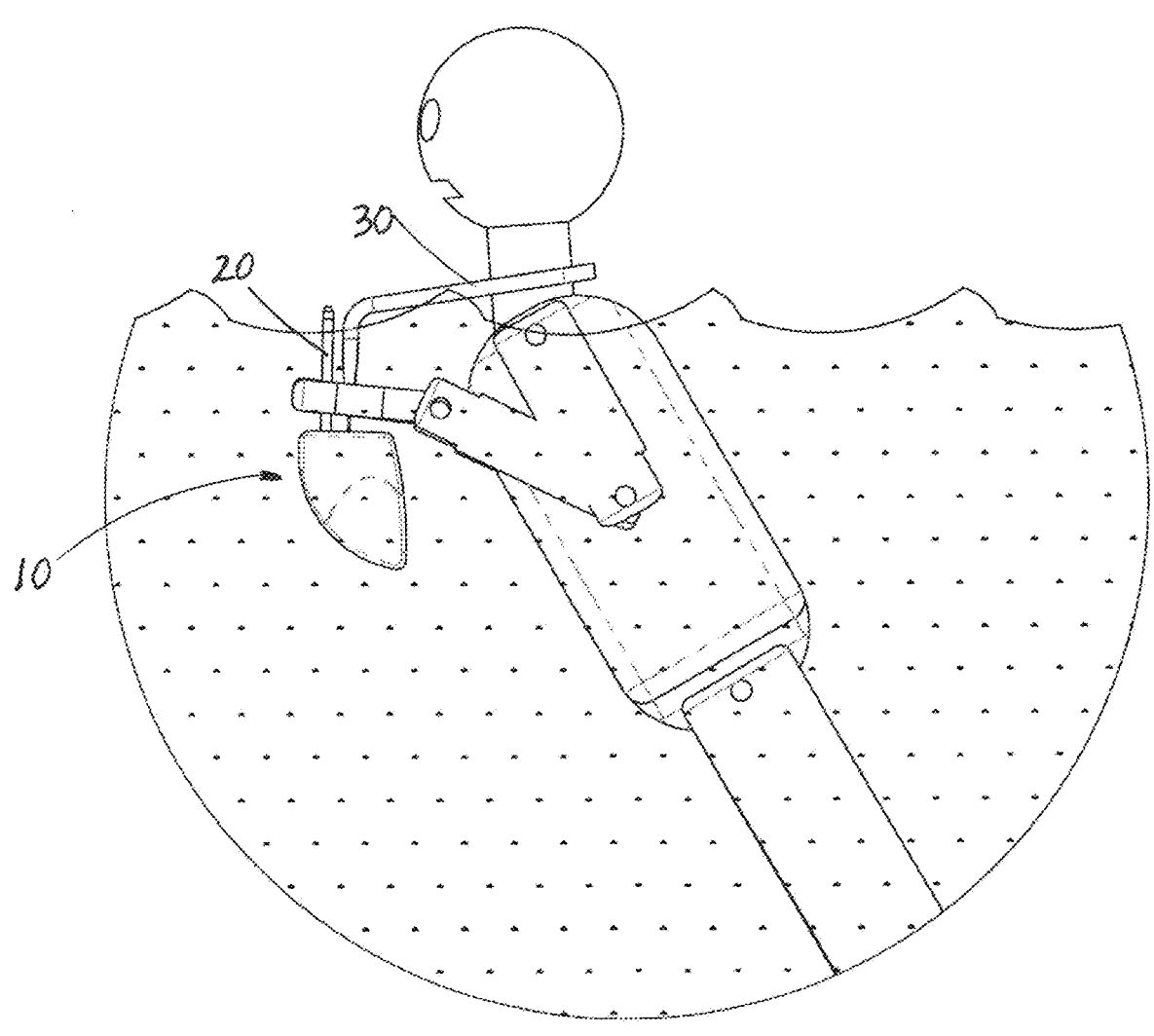
FIG. 9 is a schematic drawing representing a person using the headrest of this invention in an emergency deployment, with the headrest secured with respect to the person by its tether extending around the neck and over the shoulders of the person and the main buoyant portion being inverted and its position controlled by the hands of the person holding the upwardly-extending seat-attachment shafts.

The length of tether strap 30A and the adjustable length of tether strap 30 are such that, when the tether is withdrawn from the headrest in an emergency deployment, the headrest can in most instances be secured to the person by the tether being around the back of the neck of the person and over the person=s shoulder such that the headrest can be held in front of the person. In such a situation, the headrest is preferably held in, an inverted orientation, with its parallel shafts projecting upwardly and each shaft being held by one of the person=s hands. This use is illustrated in FIG. 9.

Such connection and orientation of the deployed headrest of this invention allows helpful manipulation by the person. This allows the person to adjust the combined buoyancy of the headrest and his or her body, so that the (often lacking) buoyancy of the person can effectively be enhanced—by the person's manipulation of the hand-controlled headrest. More specifically, this can involve the person pushing the headrest downwardly further into the water to increase the combined buoyancy of the person and headrest, or a bit upwardly to a lesser depth for greater orientation stability but still sufficient combined buoyancy.

As mentioned above, the manner by which the tether secures the headrest to a person in an emergency deployment is not as important as it being done in a manner such that the person, whether an adult or a small child, is able to continue breathing despite being in the water after an accident.

All of the drawing figures which show distal ends 21 of shafts 20 illustrate that distal ends preferably include permanently-affixed tapered carbide tips 50. Shaft distal end 21, whether or not including carbide tips, can be useful in breaking automobile glass by holding the headrest in one's hands and impacting glass with the shaft tips, as may be necessary or helpful in an emergency of any kind, particularly when time is of the essence in extracting a living human being from a vehicle after an accident, whether or not in a body of water. Having hardened tapered carbide tips 50 as part of shaft distal ends 21 facilitates such glass breaking and removal.

Acceptable and appropriate materials and methodologies for manufacture of the automotive headrest of this invention will be apparent to persons who are skilled in the art of manufacturing automotive headrests and have become aware of this patent disclosure. Sufficient details are given above, but some additional points will be made.

The rigid structure may be made of a wide variety of materials, primarily rigid long-lasting metals such as stainless steel but also well-known rigid polymeric materials, and the rigid structure can be in a variety of shapes, including other that the shape of rigid structure 16 as illustrated.

Furthermore, satisfactory attachment of the tether to the rigid structure can be accomplished in a great many ways, not only as described above and illustrated in the drawings. Examples of acceptable ways to attachment also include without limitation tying the tether to portions of the right structure and/or having loops in the tether which engage portions of the rigid structure in a manner assuring the attachment remains in place. The configuration of the rigid structure can facilitate such attachment. Another example of this could involve the tether strapping being continuous between two points of attachment to the rigid structure and having spaced grommets through which opposite leg portions of the rigid structure extend, but with the leg portions flaring a bit outwardly below the grommet attachment points so that the strapping, which is continuous between the attachment points, cannot slide toward the distal ends of the seat-attachment shafts. Many other attachment arrangements are possible.

The strap referred to herein as a preferred form of tether is of a tough woven strap material, and that may preferably be somewhat narrower than about one inch. Other strap materials are also feasible. And, while the tether as described herein is made of strapping material, a wide variety of acceptable alternatives exist, including without limitation, polymeric cords or strips, bungee cords, and many others materials whether elastic or inelastic.

While stowage of the tether within the casing should be such that it is adjacent to the accessibility opening, whatever the nature thereof, is some cases it is not essential that the entirety of the tether be adjacent to the accessibility opening. The words "adjacent to" in reference to the position of the stowed tether with respect to the accessibility opening should be interpreted sufficiently broadly to include an ability to effectively reach and grasp a portion of the tether through the accessibility opening and then withdraw the entire withdrawable portion of the tether from within the casing manually through such accessibility opening.

While the location of the accessibility opening has been described primarily as on the underside of the headrest casing, other possible locations exist for the accessibility opening, although it is desirable to provide tether accessibility without modifying the "look" of typical automotive headrests not having emergency-related characteristics of this invention.

In this connection, the manner in which a tether is readily accessible manually in an emergency situation will be effected by the nature of the tether. In a situation in which the tether, rather than being flat, is of a relatively small cross-section, perhaps of circular cross-sectional shape, the accessibility opening can be smaller as long as manual accessibility is easy, because such a tether could be unfurled from a position within the headrest casing by pulling such slender tether from its position within the casing. In some situations, stowage of the tether itself inside the headrest casing can be loosely threaded into a flexible sheath tube allowing withdrawal of the tether through the sheath tube, which itself remains in place inside the headrest casing, such manual withdrawal being without interference from the surrounding polymeric foam which may engage the outside of the sheath tube but not the inside of the sheath tube.

The nature and material makeup of the buoyant cushion body of the headrest of this invention can be matters of choice in practicing this invention. Such buoyant cushion body is preferably a foam, and most preferably a polymeric foam body using foam materials of types already frequently used in automotive headrests. While it is believed that in situ foamable polyurethane, expanded polypropylene (EPP) foams, neoprene foams, nitrile butadiene rubber (NBR) foams, and polymethylacrylimide foams would be acceptable, it is understood that many acceptable polymeric foams will be well known to those skilled in the art who are made aware of this patent disclosure. While in situ formation of the polymeric foam body using injection molding is a preferred method for foam-body formation, it may also be possible to place a preformed or precut polymeric foam body within a headrest casing, or assemble the polymeric foam body using two or more such preformed or precut polymeric bodies by placing them into a headrest casing and closing the casing sufficiently to maintain the polymeric foam body therein.

A wide variety of material choices, design choices and choices of methods will be involved in manufacture of the headrests of this invention. It is desirable that sizes of the inventive headrest not vary from sizes of existing headrests not having the characteristics of this invention. It is desirable, however, to minimize the total volume and weight of those components of the headrest which by nature are relatively heavy, such as the necessary rigid structure of the headrest, and it is desirable to maximize the total volume of the highly-buoyant materials such as the polymeric foam cushion materials. It has been recognized that the headrest of this invention can utilize typical headrest volumes and headrest materials and still well provide the purposes of this invention.

The headrest of this invention, when deployed and secured to a person who is in a body of water as the result of an accident, or who enters a body of water after deployment of the headrest on his or her person, provides sufficient additional buoyancy to enable the person to avoid or minimize the risk of drowning. And use of the invention during deployment in the manner referred to above and illustrated in FIG. 9 is particularly helpful and assuring to a person in the water by virtue of an automobile accident.

While the principles of this invention have been described in connection with specific embodiments, it should be understood clearly that these descriptions are made only by way of example and are not intended to limit the scope of the invention.

The invention claimed is:

1. In a seatback-engageable automotive headrest having (a) a cushion body of polymeric foam within a casing and (b) a rigid structure including (i) an internal portion within the cushion body and engaged therewith and (ii) a pair of rigid seat-attachment shafts spaced from one another and projecting downwardly from the cushion body for withdrawable engagement with the seatback, the improvement comprising:

the casing being configured to define an underside accessibility opening between the projecting shafts; and a tether positioned within the casing adjacent to the accessibility opening and attached with respect to the rigid structure, whereby, with the headrest withdrawn from seatback engagement, a portion of the tether can be grasped through the accessibility opening and withdrawn for securement to a person to facilitate flotation.

2. The automotive headrest of claim 1 wherein the tether is attached with respect to the internal portion of the rigid structure.

3. The automotive headrest of claim 2 wherein the accessibility opening and the tether are configured to block any view of the tether within the casing but to allow manual reaching therethrough to grasp and withdraw the tether for emergency purposes.

4. The automotive headrest of claim 2 wherein the tether is flexible strapping doubled over against a surface of the casing within the headrest, thereby minimizing storage volume for the strapping.

5. The automotive headrest of claim 2 wherein the accessibility opening is defined by inwardly-turned portions of the casing.

6. The automotive headrest of claim 2 wherein the accessibility opening is defined by overlapping portions of the casing.

7. The automotive headrest of claim 5 wherein at least one of the overlapping portions is elastically stretchable to facilitate reaching through the accessibility opening.

8. The automotive headrest of claim 2 wherein the tether has two proximal ends each attached with respect to the internal portion of the rigid structure at positions laterally spaced from one another.

9. The automotive headrest of claim 8 wherein the tether is a unitary piece continuous from one of the proximal ends thereof to the other proximal end and is of sufficient length to extend around the person.

10. The automotive headrest of claim 8 wherein the tether includes two tether pieces each including a respective one of the proximal ends and extending to a respective distal end, the distal ends being engageable together to secure the tether around the person.

11. The automotive headrest of claim 10 wherein the distal ends are adjustably engageable together to adjust the length of the tether around the person.

12. The automotive headrest of claim 2 wherein the tether is configured and arranged such that, with the tether withdrawn in an emergency deployment, the headrest is secureable to the person by the tether being around the person with the headrest in an inverted orientation in front of the person with the seat-attachment shafts projecting upwardly in position to be grasped by the person=s hands.

13. The automotive headrest of claim 1 wherein the seat-attachment shafts have tapered ends to facilitate use of the shafts for automobile glass breakage with the headrest withdrawn from seatback engagement in an emergency.

14. The automotive headrest of claim 1 wherein the seat-attachment shafts have distal ends including carbide tips to facilitate use of the shafts for automobile glass breakage with the headrest withdrawn from seatback engagement in an emergency.

15. The automotive headrest of claim 14 wherein the carbide tips are tapered.

16. A headrest including (a) a buoyant cushion body within a casing and (b) a rigid structure with an internal portion within the casing and an external portion outside the casing detachable from an automobile seatback, the improvement comprising:

the casing configured to define an accessibility opening; and a tether inside the casing, positioned adjacent to the accessibility opening, and attached to the rigid structure, whereby, with the headrest detached from the seatback, a portion of the tether can be grasped through the accessibility opening and withdrawn for securement to a person to facilitate flotation.

17. The automotive headrest of claim 16 wherein the tether is attached with respect to the internal portion of the rigid structure.

18. The headrest of claim 16 wherein the accessibility opening is on the underside of the casing and the accessibility opening and the tether are configured to block any view of the tether within the casing.

19. The headrest of claim 16 wherein the tether is flexible strapping doubled over against the inside surface to minimize strapping storage volume within the casing.

20. The headrest of claim 16 wherein the tether has two proximal ends each attached with respect to the internal portion of the rigid structure.

21. The headrest of claim 20 wherein the tether is a unitary tether piece continuous from one of the proximal ends thereof to the other proximal end and is of sufficient length to extend around the person.

22. The headrest of claim 20 wherein the tether strapping includes two tether pieces each including a respective one of the proximal ends and extending to a respective distal end, the distal ends being engageable together to secure the tether around the person.

23. The headrest of claim 16 wherein the buoyant cushion body is a foam body.

24. The headrest of claim 16 wherein the tether is configured and arranged such that, with the tether withdrawn in an emergency deployment, the headrest is secureable to the person by the tether being around the person with the headrest in an inverted orientation in front of the person with the seat-attachment shafts projecting upwardly in position to be grasped by the person=s hands.

* * * * *